Patented Aug. 9, 1949

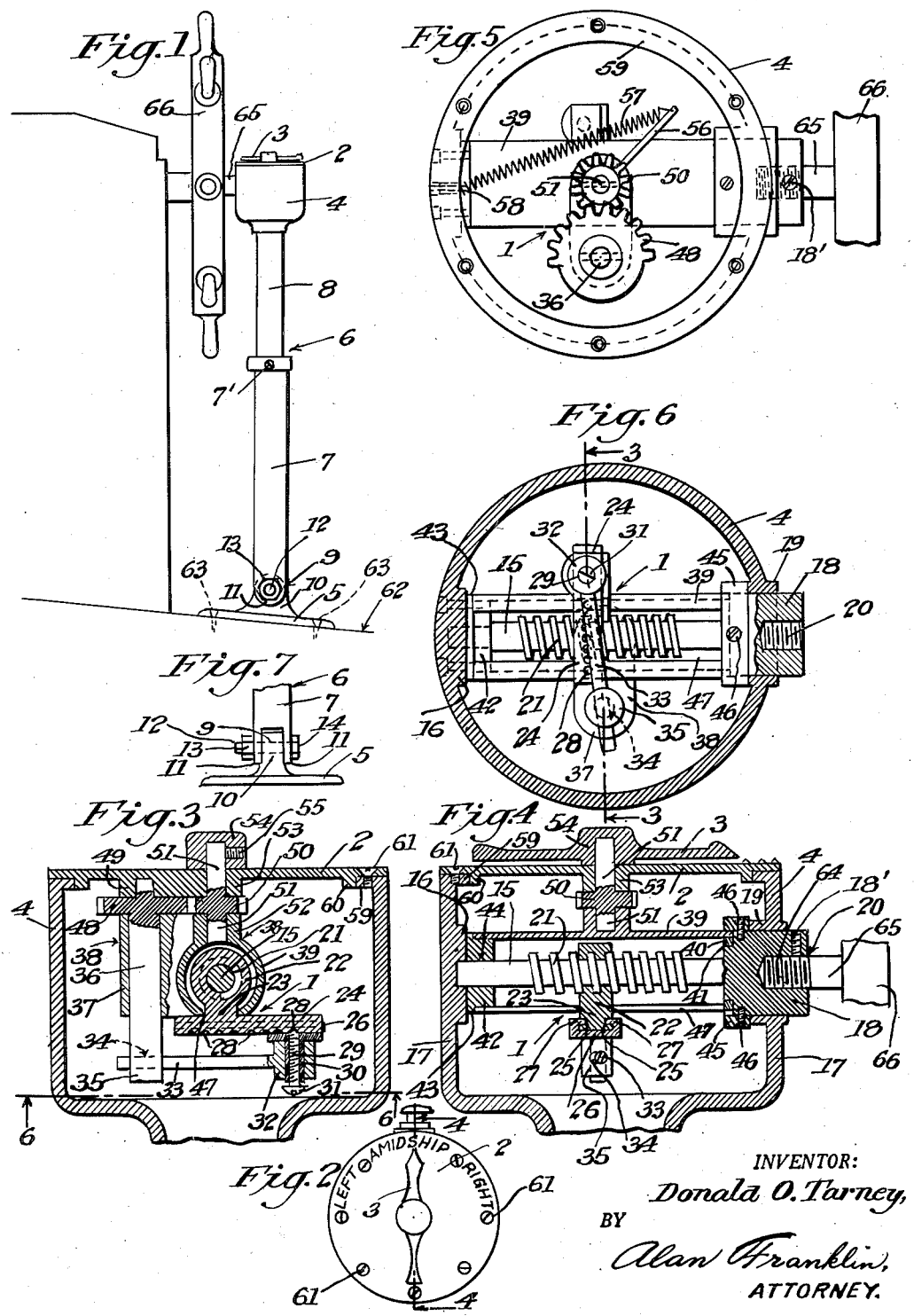

2,478,341

UNITED STATES PATENT OFFICE 2,478,341

MOTION TRANSLATION MECHANISM

Donald O. Tarney, San Pedro, Calif.

Application February 28, 1947, Serial No. 731,633

3 Claims. (Cl. 74—496)

1

This invention is a motion translation mechanism designed for use on yachts, fishing boats, tug boats and motor vessels of all types.

An important object of the invention is the provision of a rudder angle indicator attachment for the steering apparatus of vessels unequipped with built-in rudder angle indicators.

Another object is to provide a rudder angle indicator which may be detachably connected to the shaft of the steering wheel of a vessel, upon removing the hub nut from said shaft, whereby the indicator is operated by said steering wheel.

Another object is to provide a rudder angle indicator which is adjustable as to height, sheer of the deck and number of turns of the steering wheel of a vessel.

A further object is to provide a rudder angle indicator attachment of the character stated which is simple in construction, accurate in operation, durable and inexpensive.

Other objects and advantages will appear hereinafter as this specification progresses.

The invention is illustrated in the annexed drawing, which forms a part of this specification and in which:

Fig. 1 is a side elevation of my invention shown in the wheel house adjacent the rear side of the steering wheel and connected to the shaft of the steering wheel of a vessel.

Fig. 2 is a plan view of my invention.

Fig. 3 is a transverse vertical section of my invention taken on line 3—3 of Fig. 6.

Fig. 4 is a transverse vertical section of my invention taken on line 4—4 of Fig. 2.

Fig. 5 is a plan view of my invention with the cover and certain other parts removed.

Fig. 6 is a horizontal section of my invention taken on line 6—6 of Fig. 3.

Fig. 7 is a fragmentary side elevation of my invention, showing its base and a portion of the lower end of its telescopic standard pivotally connected to said base.

Referring more particularly to the drawing, in which corresponding parts are designated by the same reference numerals in all of the figures, my invention includes generally an indicator operating mechanism 1; an indicating dial 2, on the face of which are the words "Amidship," "Left" and "Right"; an indicating arm 3 for pointing respectively to said words; a casing 4, in which said operating mechanism 1 is mounted; a base 5; and a telescopic post 6 comprising a lower telescopic section 7 and an upper telescopic section 8 fitted in said lower telescopic section, said lower telescopic section being hinged at its lower end to

2 said base 5 by a hinge 9, and said casing 4 being formed on the upper end of said upper telescopic section 8. A set screw 7' is threaded in the upper end of the lower telescopic section 7 of the post 6 for engaging the upper section 8 of said post for securing said upper section adjusted to different elevations in said lower section.

The hinge 9 comprises a knuckle 10 upstanding from the base 5, a pair of knuckles 11 formed on the lower end of the telescopic section 7 of the post 6 and fitted over opposite sides of said knuckle 10, and a hinge bolt 12 and nut 13, which bolt extends through said knuckles 11 and knuckle 10 with the head 14 of said bolt engaging one of said knuckles 11 with the nut 13 tightened on said bolt against the other knuckle 11, whereby the post 6 is adjustably secured at any suitable angle to which the post may be swung on the hinge 9.

A shaft 15 extends diametrically of and within the casing 4, with its rear end journaled in a bearing 16 at the rear side of the vertical wall 17 of said casing, and with its forward end formed with a cylindrical coupling 18 journaled in a bearing 19 in the forward side of said vertical casing wall, which coupling extends through said bearing 19 and said casing wall 17 and is formed in its outer end with a threaded coupling socket 20. A set screw 18' is threaded in said coupling 18 into said socket 20. On said shaft 15, intermediate its ends, is formed a screw 21 on which is threaded a nut 22 from which depends a shank 23, on the lower end of which is formed an arm 24 extending horizontally transversely with relation to the axis of said nut. Extending longitudinally in the side edges, respectively, of said arm 24 are a pair of grooves 25, and a slide 26 is fitted over the lower edge of said arm 24, which slide is formed at its upper edges with a pair of inturned flanges 27 slidably fitted in said grooves 25, respectively, whereby said slide 26 is slidably mounted on said arm 24 to slide longitudinally thereon. In the lower edge of the arm 24 are formed a plurality of sockets 28 spaced longitudinally of said arm, to receive the upper ends of a screw 29 threaded in a stud pivot 30, depending from the lower side of the arm 24 at the outer end thereof, the upper end of said screw 29 extending through said arm for engaging any one of said sockets 28 for securing the slide 26 in adjusted positions along the arm 24, for the purpose hereinafter described. The head 31 of the lower end of the screw 29 is larger in diameter than the diameter of the stud pivot 30, for engaging the lower end of a knuckle 32, turnably fitted on said stud pivot, for preventing said knuckle from dropping off said stud pivot. From said knuckle 32 extends a rod 33 transversely of the axis of the shaft 15, with the end portion of said rod slidably extending through a bore 34 extending diametrically through a head 35 on the lower end of a vertical shaft 36 journaled in a bearing 37 formed on a gear mounting 38, which is also formed with a horizontal supporting sleeve 39 turnably mounted on the shaft 15, which extends axially through said sleeve. One end of said sleeve 39 is turnably fitted and mounted on a bearing ring 40 which is tightly fitted on a reduced inner end portion 41 of the cylindrical coupling 18, with said end of said sleeve fitting on said ring and abutting against the inner end of said coupling, and with the periphery of said sleeve flush with the periphery of said coupling. In the other end of the sleeve 39 is tightly fitted a plug 42 with an external flange 43 on its outer end engaging said end of said sleeve, and with the outer end of said plug abutting the bearing 16, which plug is formed with an axial opening 44 through which the shaft 15 turnably extends, whereby said other end of said sleeve 39 is turnably mounted on said shaft. A collar 45 is fitted on the inner end of the coupling 18 and partly extends over the adjacent end of the sleeve 39, and said collar is secured on said coupling adjacent the inner end of the bearing 19 by screws 46, whereby the coupling 18 and the shaft 15 are prevented from moving outwardly through said bearing 19. The engagement of one end of the sleeve 39 with the inner end of the coupling 18, and the engagement of the outer end of the plug 42 with the inner end of the bearing 16 prevent movement of the shaft 15 outwardly through said bearing. The sleeve 39 is provided with a slot 47 in its lower side through which the shank 23 of the nut 22 depends so that said shank may be moved through said slot by the nut 22 for movement of the arm 24, slide 26, and knuckle 32 axially of the screw 21, when the nut 22 is so moved by said screw in the manner hereinafter more fully described.

On the upper end of the shaft 36 is secured a segmental gear 48 which rests upon the upper end of the bearing 37 and holds the head 35 on the lower end of said shaft in position against the lower end of said bearing. The upper end of the shaft 36 extends above the segmental gear 48 into a bearing 49 on the under side of the dial 2 on the upper end of the casing 4. The segmental gear 48 meshes with a pinion 50 secured on a vertical shaft 51 journaled below said pinion in a bearing 52 in the gear mounting 38 directly above the screw 21 and in the center of the casing 4, said pinion resting upon the upper end of said bearing. Said shaft 51 extends upwardly from said pinion 50 through a bearing 53 on the upper side of the dial 2 and through said dial, and the hub 54 of the indicating arm 3 is fitted on the upper end of said shaft 51 and is secured thereto by a set screw 55, with said shaft and said arm above said dial, so that turning of said shaft will swing said indicating arm over the face of said dial. A rod 56 is secured at one end to the pinion 50 and extends radially therefrom, and a spring 57 is secured at one end to the outer end of said rod and at its other end to a pin 58 in the vertical wall 17 of the casing 4, for taking up back lash between said pinion 50 and the segmental gear 48.

The upper end of the casing is formed with an internal annular flange 59 upon which rests the dial 2 and said dial is formed on its under side with a depending annular flange 60 which fits within said casing flange 59. The dial 2 is detachably secured on the upper end of the casing 4 by screws 61 which extend downwardly through openings in said dial and are threaded in the upper end of said casing.

The base 5 upon which my invention is mounted rests upon the deck 62 of a vessel and is secured to said deck by screws 63 extended through openings in said base and driven into said deck.

On the dial 2 the word "Amidship" is arranged between the words "Left" and "Right" on said dial adjacent the forward edge thereof.

The operation of my invention is as follows:

The conventional nut being removed from the rear threaded end 64 of the shaft 65 of the steering wheel 66 of a vessel, my invention is placed adjacent the rear side of said steering wheel, with the base 5 resting upon the deck 62 of said vessel, and the telescopic section 8 being adjusted to the proper height in the section 7 of the post 6, said section 8 is secured in said position by the set screw 7', whereupon said threaded end 64 of the steering wheel shaft is screwed into the threaded socket 20 of the coupling 18 of my invention, and said threaded end of said shaft is secured in said coupling by tightening the set screw 18' against said threaded end of said shaft.

The post 6 being adjusted to the proper angle to the base 5 by swinging the lower end of said post on the hinge 9, said post is secured in said adjusted position by tightening the nut 13 on the hinge bolt 12 against the adjacent knuckle 11 on the lower end of said bolt, so that with the base 5 resting upon the inclined deck 62 the post 6 will extend upwardly from said base in a vertical position. The base 5 is then secured to the deck 62 by the screws 63. With the steering wheel shaft 65 coupled by the coupling 18 to the shaft 15 of my invention, the word "Amidship" on the dial 2 is centered adjacent the forward edge of said dial over the axis of said steering wheel shaft with the word "Left" to the left and the word "Right" to the right of said word "Amidship."

When the steering wheel 66 is in position holding the rudder of the vessel in alignment with the keel of the vessel for steering the vessel on a straight course, the indicating arm 3 points directly ahead parallel to the keel of the vessel and midway between the first and last letters of the word "Amidship", which indicates the straight and central position of the rudder.

When the steering wheel 66 and the rudder of the vessel are turned to the left, the indicator arm 3 is likewise turned to the left, through the medium of the steering wheel shaft 64, coupling 18, shaft 15 and its screw 21, nut 22, arm 24 and slide 26, rod 33, head 35 and gear shaft 36, segmental gear 48, pinion 50 and shaft 51, so that said indicating arm 3 points to the word "Left" on the dial 2 and indicates the position of the rudder turned to the left, during which operation the head 35, shaft 36 and segmental gear 48 are turned by the outer end of the rod 33 slidably engaging the bore 34 in said head as the inner end of said rod pivoted to the slide 26 is moved to the left and turned on the stud pivot 32, by movement to the left of the slide 26 and arm 24, and the nut 22 engaged by the screw 21, whereby the pinion 50 and shaft 51 are turned by the segmental gear 48 to swing the indicator arm 3 to the left as aforesaid.

When the steering wheel 66 and the rudder of the vessel are turned to the right, the indicator arm 3 is likewise turned to the right, through the medium of the steering wheel shaft 64, coupling 18, shaft 15 and its screw 21, nut 22, arm 24 and slide 26, rod 33, and the head 35 and gear shaft 51, so that said indicating arm 3 points to the word "Right" on the dial 2 and indicates the position of the rudder of the vessel turned to the right, during which operation the head 35, shaft 36 and segmental gear 48 are turned by the outer end of the rod 33 slidably engaging the bore 34 in said head, as the inner end of said rod, pivoted to the slide 26, is moved to the right and turned on the stud pivot 32 by movement to the right of the slide 26 and arm 24, and the nut 22 engaged by the screw 21, whereby the pinion 50 and shaft 51 are turned by the segmental gear 48 to swing the indicating arm 3 to the right as aforesaid.

My invention may be adjusted to the number of turns of a steering wheel required to turn a rudder to its extreme position to the right or to the left, by moving the slide 26 to the correct position on the arm 24 when said arm is moved by a nut 22 on an 8 pitch screw 21 for adjustment from two to four turns of the steering wheel, or, for a greater number of turns of the steering wheel, by removing the shaft 15 and its said screw 21 and substituting another shaft with a screw of a higher pitch.

In adjusting my invention for the purpose stated, by shifting the slide 26 along the arm 24, the screw 29 is first turned until its end disengages a socket 28 in said arm, said slide is then moved along said arm until another socket 28 is brought into registration with said screw 29 and said screw is then turned until its end engages said other socket.

I claim:
1. A motion translation mechanism including a casing, a screw shaft journaled in said casing, a screw on said shaft, means whereby said shaft may be turned in one direction or the other, a nut threaded on said screw, a shank depending from said nut, an arm on the end of said shank, a sleeve loosely mounted on said shaft and through which said shaft and screw axially extend, said sleeve being provided with a longitudinal slot through which said nut shank extends, a bearing on said sleeve, a transmission shaft journaled in said bearing, a head on the lower end of said transmission shaft provided with a transverse bore, a crank rod pivotally mounted at one end on said arm with its other end slidably extending through said bore in said head, a gear on the upper end of said shaft, another bearing on said sleeve, a transmission shaft journaled in said other bearing to which shaft may be connected a mechanism to be driven, and a pinion on said transmission shaft in mesh with said gear.

2. A motion translation mechanism as characterized by claim 1 in which the pivot mounting of the crank rod is adjustable lengthwise of said arm.

3. A motion translation mechanism as characterized by claim 1 in which the pivot mounting of the crank rod includes a slide on the arm, a stud pivot on said slide, a knuckle on the crank rod turnably positioned on said stud pivot, and a screw threaded through said stud pivot, so that the end of the screw may engage one of a plurality of sockets in said arm for securing said slide in adjusted position on said arm.

DONALD O. TARNEY.

REFERENCES CITED

The following references are of record in the file of this patent:

UNITED STATES PATENTS

| Number | Name | Date |
| --- | --- | --- |
| 1,173,680 | Peters et al. | Feb. 29, 1916 |
| 1,776,439 | Kinninger | Sept. 23, 1930 |
| 1,895,838 | Schoradt | Jan. 31, 1933 |
| 2,002,657 | Correll | May 28, 1935 |